Figure 1:
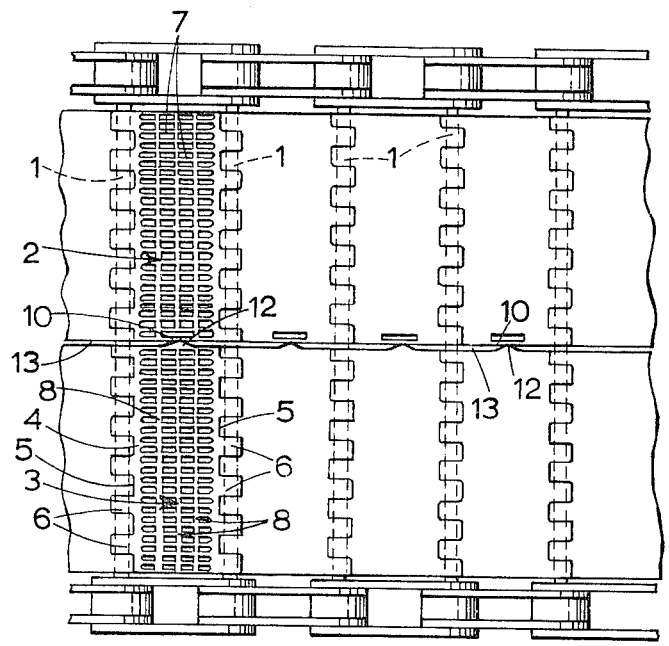

United States Patent [19]
Norton

[11] 3,945,487
[45] Mar. 23, 1976

[54] BAND CONVEYORS

[75] Inventor: Ellis Charles Norton, Wolverhampton, England

[73] Assignee: U.M.E.C. - Boydell (Belting) Limited, Wolverhampton, England

[22] Filed: Mar. 7, 1975

[21] Appl. No.: 556,284

[30] Foreign Application Priority Data
Mar. 23, 1974 United Kingdom............... 13033/74

[52] U.S. Cl................................. 198/195; 198/189
[51] Int. Cl.². ........................................ B65G 17/06
[58] Field of Search............................ 198/189, 195

[56] References Cited
UNITED STATES PATENTS

| | | | |
|---|---|---|---|
| 1,274,385 | 8/1918 | Colburn............................... | 198/189 |
| 3,774,752 | 11/1973 | Harvey................................ | 198/195 |
| 3,785,476 | 1/1974 | Poerink............................... | 198/189 |
| 3,799,328 | 3/1974 | Harvey................................ | 198/195 |

Primary Examiner—John J. Love
Assistant Examiner—Jeffrey V. Nase
Attorney, Agent, or Firm—Kemon, Palmer & Estabrook

[57] ABSTRACT

In a conveyor band which has load-bearing components of expandible plastics material hinged to transverse rods with two or more of the components extending end-to-end across the width of the band between each adjacent pair of rods, interengaging projections and flexible portions are provided at the adjacent ends of the components. Normally the flexible portions are unflexed and the projections space the adjacent ends of the components apart, but in the event of expansion of the plastics material, for example as a result of water absorption, which causes lateral expansion of the components, the flexible portions flex under the effect of the increased pressure exerted on them by the projections and permit the components to move closer together. Thus expansion of the components is accommodated internally of the band, leaving its width unaltered.

5 Claims, 5 Drawing Figures

BAND CONVEYORS

This invention relates to band conveyors.

In many applications of use it is advantageous to employ conveyor bands which have load-bearing components made of plastics material. For example, they are lighter than bands which have metal load-bearing components, problems of corrosion are avoided and they can be kept clean relatively easily. However, some plastics materials, notably nylon-based materials, whilst being very satisfactory in many respects can give rise to problems in situations where they come into contact with water, or are used in an atmosphere which has a high moisture content, because they absorb water. As they absorb the water they expand and this can cause excessive friction in the band as joints tighten and parts rub together which previously had been out of contact, or only in light contact with one another. This puts a strain on the drive mechanism and breakdowns can result. Allowances can be made relatively easily to reduce the effect of expansion of the components in the lengthwise direction of the band, but hitherto owing to the close tolerances normally necessary in the lateral direction to ensure correct operation of the band, satisfactory allowance has not been made for lateral expansion of the components. Consequently where contact with water or moisture is likely to be involved other plastics materials have been used which, although not being water absorbant, do not offer such good properties in other respects. Few materials can be used as successfully as nylon at low temperatures, or have the self-lubricating properties of nylon which are often so desirable.

It is an object of the present invention to provide a conveyor band which makes allowance for lateral expansion of the load-bearing components, and which may therefore have load-bearing components made of water-absorbant plastics material even though the band may be used in conditions where the components will be in contact with water.

The present invention consists in a conveyor band which comprises spaced transverse rods and load-bearing components made of expandible plastics material which extend between and are hinged to said transverse rods, and wherein there is a plurality of said load-bearing components disposed end-to-end laterally of the band between each adjacent pair of said transverse rods, and adjacent ends of said plurality of load-bearing components have in respect of a first one of said ends a projection which extends away from said first end towards a second one of said ends, and in respect of said second end a flexible portion with which said projection engages and which is normally unflexed but is able to deflect inwardly away from said first end under increased pressure exerted on it by said projection. The construction and arrangement is such that when said plastics material of said load-bearing components is unexpanded and said flexible portion is unflexed said first and second adjacent ends of said load-bearing components are spaced laterally apart by said projection, and in the event of expansion of said plastics material causing lateral expansion of said load-bearing components said flexible portion is caused to be deflected inwardly by the increased resultant pressure exerted on said portion by said projection, and said adjacent ends are thereby permitted to move closer together.

By the expression "expandible plastics material" is meant here any plastics material which is liable to expand to some extent under certain conditions of use whether it be because of contact with water as in the case of nylon and nylon-based materials, or heat or perhaps even other circumstances.

It will be seen that with the arrangement now provided the overall width of the band, which is usually a critical dimension requiring close control because of the fixed width of the track along which the band runs, is unaffected by lateral expansion of said components which may occur in use, as the expansion is taken up internally of the band. Hence the band is still able to operate satisfactorily.

Normally said projection will act simply as a spacer and there will be only light contact between it and said flexible portion sufficient to prevent free movement between them laterally of the band. There may be more than one said projection and flexible portion.

Said projection may be a small pip, nodule or other protrusion having a pointed extremity which when said projection is acting as a spacer has just point or line contact with said flexible portion so as to minimise friction between said components.

Said flexible portion may be a part of said second end of reduced thickness which will bend more readily than the rest of said end. Said end may, for example, be an elongated member, such as a bar or flange, extending in the lengthwise direction of the band and said flexible portion may be formed by a part of said elongated member of reduced thickness. Alternatively said flexible portion may be formed by a part of said second end which is supported less sturdily than the rest of said end. Thus, where said second end is formed again by an elongated member extending in the lengthwise direction of the band said flexible portion may be a part of said elongated member, said elongated member being prevented from flexure except at said flexible portion by stiffening means, such as webs or the like, at intervals along said elongated member. Said flexible portion may be provided in various other ways.

Figure 4:
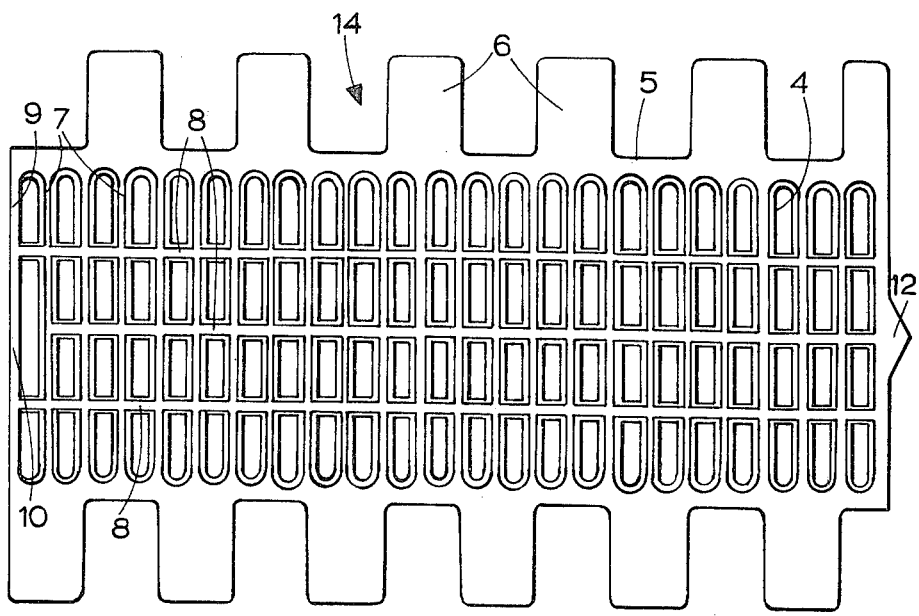
Figure 3:
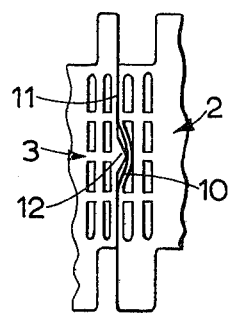
Figure 2:
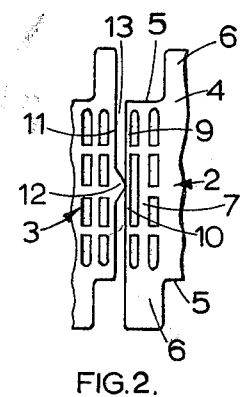
Figure 5:
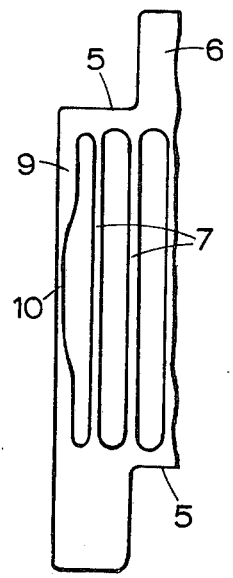

An embodiment of a conveyor band in accordance with the invention will now be described by way of example with reference to the accompanying drawings in which, FIG. 1 is a plan view of part of the conveyor band, FIGS. 2 and 3 are fragmentary detail views on an enlarged scale showing end portions of two laterally adjacent components in the band respectively in a normal, unexpanded condition, and in an expanded condition, FIG. 4 is a plan view of another form of load-bearing component, and FIG. 5 is a fragmentary detail view showing a modified form of load-bearing component.

Referring to FIG. 1, the conveyor band comprises a series of equally spaced rods 1 which extend transversely of the band, and load-bearing components in the form of moulded nylon modules 2,3 which extend between and are hinged to the rods 1. There are two modules 2,3 disposed end-to-end laterally of the band between each pair of adjacent rods 1.

Each module 2,3 has an oblong rectangular body 4 disposed with its longer sides 5 extending laterally of the band. Projecting from and integral with the longer sides 5 are co-axial equally-spaced, externally cylindrical eye portions 6 through which the rods 1 pass and hingedly connect the module to the rods. The eye portions 6 at one side of the body 4 are staggered with respect to those at the opposite side. The eye portions 6 of adjacent modules in the lengthwise direction of the band intercalate with one another at the rods 1 to which they are connected.

The body 4 of each module 2,3 has a series of equally-spaced parallel bars 7 which extend between the two longer sides 5 and are joined at intermediate parts of their lengths by stiffening webs 8 which are disposed in three rows running parallel to the longer sides 6 between opposite ends of the body.

One module 2 of the two between each pair of adjacent rods 1 has, as shown more clearly in FIGS. 2 and 3, a bar 9 at one end of its body 4 which is somewhat thinner than the other bars 7. This end bar 9 is joined to its neighbouring bar 7 only by two of the stiffening webs 8, these being in the two outer rows of stiffening webs. Hence a central portion 10 of the end bar 9 is left unsupported and, as the bar is quite thin, relatively flexible.

The other module 3 has at one end of its body 4 a bar 11 of similar thickness to the other bars 7 and which like the other bars is stiffened by three of the webs 8. On this end bar 11 there is a triangular pip 12 which projects laterally outwards from the bar at its midpoint. The two modules 2,3 between each pair of rods 1 are arranged with the pip 12 of one module 3 next to the flexible portion 10 of the end bar 9 of the adjacent module 2. Normally the pip 12 makes only light, substantially line, contact at its apex with the flexible portion 10, FIG. 2, and serves merely to keep the modules 2,3 spaced laterally a small distance part from one another, the width of the resultant space 13 between the modules corresponding substantially to the distance between the bars 7 in the bodies 4 of the modules. The inherent stiffness of the flexible portions 10 keeps it straight and unflexed under these conditions.

If the band should become wet and water is absorbed by the modules 2,3 with the result that they expand, the spaces 13 between the modules and the interaction of the pips 12 and flexible portions 10 allow movement of the modules towards one another laterally inwardly of the band as they expand. In the course of the expansion the pips 12 are urged more and more tightly against the flexible portions 10 which deflect under the pressure, as shown in FIG. 3. Consequently the expansion is accommodated without altering the overall width of the band.

The diameters of the holes, not shown, in the eye portions 6 of the modules may be made sufficiently oversize in relation to the rods 1 to allow movement of the modules relative to the rods lengthwise of the band as a result of longitudinal expansion of the modules.

Thus any expansion of the modules whilst the band is in use has minimal effect on the operation of the band.

There may be a transverse row of more than two modules across the width of the band, if required, between each pair of adjacent rods. In this case the end modules of the row may have the forms just described, one having the flexible portion 10 and the other the pip 12, and the or each intermediate module of the row may have the form shown in FIG. 4 of the drawings. This further form of module 14 is of generally similar construction to the modules 2,3 described, and common parts are indicated in the drawing by corresponding reference numerals, but there is the difference that this module has a flexible portion 10 at one of its ends and a pip 12 at the other. The flexible portion 10 and the pip 12 are in fact similar to those provided on the previously described modules 2,3. In each transverse row of modules the modules at the ends of the row are disposed with their ends having the flexible portion 10 and pip 12 respectively innermost, that is towards the intermediate module or modules 14, and the or each intermediate module 14 is so arranged in relation to the end modules, and the intermediate modules are so arranged in respect to one another where there is a plurality of intermediate members, that in the row the pip 12 of one module is next to the flexible portion 10 of an adjacent module. As before, therefore, any expansion of the modules laterally of the band will be accommodated within the band and the width will consequently be unchanged.

A modified form of load-bearing component is shown in FIG. 5 of the drawings. This component is also a moulded module. It differs in two respects from the previously described modules. One difference is that there are no stiffening webs between parallel bars 7 of its oblong rectangular body 4 which extend between the two longer sides 5 of the body; the other difference is in the manner in which a flexible portion 10 at one end of the body 4 is provided. Here a bar 9 at the end of the body is of similar thickness to the other bars 7 except as its central part which is of reduced thickness to form the flexible portion 10. Except at the flexible portion 10 the bar 9, like the other bar 7, is substantially rigid and self-supporting. The load-bearing component or components with which the described component is mounted in a conveyor between an adjacent pair of rods has or each have a body of similar general construction with parallel bars extending between the longer sides without stiffening webs. The projection of the adjacent component which cooperates with the flexible portion 10 may be similar to the pips 12 of the modules 3 shown in FIGS. 1 to 3, and in FIG. 4.

I claim:

1. A conveyor band comprising spaced transverse rods and load-bearing components made of expandible plastics material which extend between and are hinged to said transverse rods, wherein there is a plurality of said load-bearing components disposed end-to-end laterally of the band between each adjacent pair of said transverse rods, and adjacent ends of said plurality of load-bearing components have in respect of a first one of said ends a projection which extends away from said first end towards a second one of said ends, and in respect of said second end a flexible portion with which said projection engages and which is normally unflexed but is able to deflect inwardly away from said first end under increased pressure exerted on it by said projection, the construction and arrangement being such that when said plastics material of said load-bearing components is unexpanded and said flexible portion is unflexed said first and second adjacent ends of said load-bearing components are spaced laterally apart by said projection, and in the event of expansion of said plastics material causing lateral expansion of said load-bearing components said flexible portion is caused to be deflected inwardly by the increased resultant pressure exerted thereon by said projection, and said adjacent ends are thereby permitted to move closer together.

2. A conveyor band according to claim 1 wherein said projection has a pointed extremity which makes point or line contact with said flexible portion.

3. A conveyor band according to claim 1 wherein said second end is formed by an elongated member of said load-bearing component extending in the lengthwise direction of the band, and said flexible portion is a part of said elongated member, there being stiffening means at intervals along said elongated member which prevents said elongated member from flexure except at said flexible portion.

4. A conveyor band according to claim 1 wherein said second end is formed by a self-supporting elongated member of said load-bearing component extending in the lengthwise direction of the band, and said flexible portion is a part of said elongated member which is of less thickness than the rest of said elongated member.

5. A conveyor band comprising spaced transverse rods and load-bearing components made of expandible plastics material which extend between and are hinged to said transverse rods, wherein there is a plurality of said load-bearing components disposed end-to-end in a row laterally of the band between each adjacent pair of said transverse rods, said row comprising first and second end load-bearing components and at least one intermediate load-bearing component, said first end component having at its end a projection which extends away from said inner end, said second end component having at its inner end a flexible portion which is normally unflexed but is able to be deflected inwardly of said second end component under applied pressure, and said intermediate component has at one end thereof a projection which extends away from said one end and at its other end a flexible portion which is normally unflexed but is able to be deflected inwardly of said intermediate component under applied pressure, said components of said row being disposed with said projections in engagement with said flexible portions, and the construction and arrangement being such that when said plastics material of said load-bearing components is unexpanded and said flexible portions are unflexed said components of said row are spaced laterally apart from one another by said projections, and in the event of expansion of said plastics material causing lateral expansion of said components said flexible portions are caused to be deflected inwardly by the increased resultant pressure exerted thereon by said projections, and said components are thereby permitted to move closer together.

* * * * *